(12) United States Patent
Stefanini et al.

(10) Patent No.: US 8,593,017 B2
(45) Date of Patent: Nov. 26, 2013

(54) MINIATURIZED GENERATOR WITH OSCILLATING MAGNETS FOR THE PRODUCTION OF ELECTRIC ENERGY FROM VIBRATIONS

(75) Inventors: Cesare Stefanini, Vicopisano (IT); Piero Castrataro, Isernia (IT); Dino Accoto, Andrano (IT)

(73) Assignee: Pirelli Tyre S.p.A., Milan (IT)

( * ) Notice: Subject to any disclaimer, the term of this patent is extended or adjusted under 35 U.S.C. 154(b) by 413 days.

(21) Appl. No.: 13/122,660

(22) PCT Filed: Oct. 5, 2009

(86) PCT No.: PCT/IB2009/054337
§ 371 (c)(1),
(2), (4) Date: Apr. 5, 2011

(87) PCT Pub. No.: WO2010/041186
PCT Pub. Date: Apr. 15, 2010

(65) Prior Publication Data
US 2011/0181132 A1  Jul. 28, 2011

(30) Foreign Application Priority Data
Oct. 6, 2008  (IT) .................... FI2008A0191

(51) Int. Cl.
*H02K 35/02*  (2006.01)
(52) U.S. Cl.
USPC ............... 310/15; 310/21; 310/28; 310/29; 290/1 R
(58) Field of Classification Search
USPC ................. 310/15, 20, 21, 28, 29, 32, 36, 37; 290/1 R
See application file for complete search history.

(56) References Cited

U.S. PATENT DOCUMENTS

| 4,260,901 | A | * | 4/1981 | Woodbridge ................... 290/42 |
| 5,578,877 | A |   | 11/1996 | Tiemann |
| 7,009,315 | B2 |   | 3/2006 | Takeuchi |
| 7,586,220 | B2 | * | 9/2009 | Roberts ........................... 310/15 |
| 2002/0172060 | A1 |   | 11/2002 | Takeuchi |
| 2007/0007827 | A1 |   | 1/2007 | Harris et al. |
| 2008/0278008 | A1 |   | 11/2008 | Roberts et al. |

FOREIGN PATENT DOCUMENTS

| DE | 195 20 521 A1 | 12/1995 |
| EP | 1 598 219 A2 | 11/2005 |
| FR | 2 838 885 A1 | 10/2003 |
| GB | 2 311 171 A | 9/1997 |
| GB | 2 425 222 A | 10/2006 |

(Continued)

OTHER PUBLICATIONS

International Search Report from the European Patent Office for International Application No. PCT/IB2009/054337, mailing date Feb. 16, 2010.

*Primary Examiner* — Dang Le
(74) *Attorney, Agent, or Firm* — Finnegan, Henderson, Farabow, Garrett & Dunner, L.L.P.

(57) ABSTRACT

An electric energy generator from a vibrational field includes a body of non-ferromagnetic material, at least one pair of permanent magnets pivotally hung from the body in such a way that they are arranged therebetween. The magnets have faces of equal magnetic polarity turned to each other from opposite sides of the body, whereby a repulsive force is established between the magnets tending to keep them spread apart in an equilibrium position. A plurality of electric coils is arranged on the surface of the body so as to intercept the magnetic field generated by the magnets. The body is configured to be connectable to a vibration source, the vibration contrasting the repulsive force and causing an oscillation of the magnets about the equilibrium position, thereby generating a magnetic flux variation and thus an electric power production as an output from the electric coils.

10 Claims, 3 Drawing Sheets

(56) References Cited

FOREIGN PATENT DOCUMENTS

| | | |
|---|---|---|
| JP | 08-65992 | 3/1996 |
| JP | 2005-335692 | 12/2005 |
| WO | WO 2005/022726 A1 | 3/2005 |
| WO | WO 2005/031952 A1 | 4/2005 |
| WO | WO 2008/062377 A2 | 5/2008 |

* cited by examiner

US 8,593,017 B2

MINIATURIZED GENERATOR WITH OSCILLATING MAGNETS FOR THE PRODUCTION OF ELECTRIC ENERGY FROM VIBRATIONS

CROSS REFERENCE TO RELATED APPLICATIONS

This application is a national phase application based on PCT/IB2009/054337, filed Oct. 5, 2009, which claimed the priority of Italian Patent Application No. FI2008A000191, filed Oct. 6, 2008, the content of both of which is incorporated herein by reference.

FIELD OF THE INVENTION

The invention relates generally to the field of energy generation, in particular through recovery from sources available in the environment. More precisely, the invention concerns a miniaturized generator with oscillating magnets for the production of electric energy from vibrations.

BACKGROUND ART

Most of the devices developed to this day for the recovery of vibrational energy use a mobile mass connected to an elastic element that, once excited, begins to oscillate. This oscillation movement allows electric current to be generated in two ways:
- through a piezoelectric generator (see, for example, patents FR2838885 and JP2005335692),
- through induction, by coupling the oscillating mass, featured by suitable magnetic properties, with a fixed coil (see for example, U.S. Pat. No. 7,009,315).

In U.S. Pat. No. 7,009,315, for example, vibration is applied to a copper coil and is transmitted through a spring to a magnet causing a relative movement between the copper coil and the magnet. Such a movement generates a variable magnetic field which causes electromagnetic induction that in turn induces the generation of current in the copper coil. Other examples of systems of this type are disclosed in WO2005022726, GB2311171 JP8065992.

WO2008/062377 discloses a device for converting the mechanical energy associated with the vibration generated by vibrating means to which the device is connected into electrical energy, the device comprising at least one ferromagnetic stator with a coaxial electric winding and a magnetic mass which is mobile with respect to the stator and forms a magnetic circuit with the stator and the electric coil. The magnetic mass is movable perpendicularly with respect to the axis of the coil in response to vibrations generated by the vibrating means, whereby the magnetic circuit has a correspondingly variable gap width. Elastic means are provided at the ends of stroke of the mobile magnetic mass and the coil is electrically connected to generated energy storage means through a conditioning circuit. Like for almost all analogous existing devices, the previous system described hereby uses ferromagnetic material on which the magnetic flux is closed. The circuit in ferromagnetic material increases the weight and the bulk of the device and limits the possibility of miniaturization. Moreover, the presence of a substantial volume of ferromagnetic material, with respect to the volume of the entire device, causes a decreasing of the efficiency due to magnetic hysteresis cycle of the ferromagnetic material and to energy dispersion associated with the parasitic currents induced therein.

Another electromechanical generator for converting vibrational mechanical energy into electric energy is described in GB 2425222. The generator according to this patent comprises a substantially annular high-permeability core including at least one permanent magnet, so as to define a magnetic circuit, and an electric winding around an arm thereof. The core is pivotally mounted on a support and on a diametrically opposite side it has a gap within which a body made from a highly permeable material is arranged. The body is spaced from the respective end faces of the annular core, so that an oscillation of the core around its oscillation axis generates a relative movement between the end faces of the core and the body. The variable relative position between the end faces of the core and the body produces variations in the magnetic flux in the core which induce an electric current in the winding. The passing of the magnetic flux through the body generates a force contrasting the movement generated by the vibration on the oscillating core which forces the core to bring its end faces back into alignment with the body.

The aforementioned generators have structural characteristics that limit the possibility of miniaturizing them: for example, due to their intrinsic bulk, it is not possible to make an optimal arrangement of the electronic components inside them; the presence of the ferromagnetic cores has a negative impact upon their weight, on their efficiency, as well as on their constructive simplicity.

SUMMARY OF THE INVENTION

The general object of the present invention is to provide an electric energy generator from vibrations by which the aforementioned limitations of generators according to the prior art are overcome and allowing a greater miniaturization.

A particular object of the present invention is to provide a generator of the aforementioned type which allows the energy which can be extracted from a vibrating support to be maximized.

Another object of the present invention is to provide a generator of the aforementioned type by which friction losses, contact wearing and seizure risks are minimized.

A further object of the present invention is to provide a generator of the aforementioned type which has a high constructive simplicity associated with a structure having good tolerance to particulate matter.

These objects are achieved with a generator of electric energy from vibrations according to the present invention by a body (7) of non-ferromagnetic material, at least one pair of permanent magnets (3, 4) pivotally hung from said body in such a way said body is arranged therebetween, said magnets being magnetized in such a way that a repulsive force is established tending to keep said magnets spread apart in an equilibrium position, and a plurality of electric coils (8, 9, 10) arranged on the surface of said body in such a way to intercept the magnetic field generated by said magnets, wherein said body is capable of being configured to connect to a vibration source (11), said vibrations causing an oscillation of said magnets about said equilibrium position which generates a corresponding variation of magnetic flux linked to said plurality of electric coils.

In other aspects of the electric energy generator from vibrations according to the present invention, said at least one pair of magnets may have faces of equal magnetic polarity turned to each other from opposite sides of said body; and said at least one pair of magnets (3, 4) may be connected with said body through at least one rotational member (5, 6) defining two parallel hinge axes (X, Y), wherein each magnet (3, 4) of said at least one pair of permanent magnets may be pivotally connected with said body (7) through a respective rotational element (5, 6), said hinge axes (X, Y) being at parallel, opposed edges of said body.

In still other aspects of the electric energy generator from vibrations of the present invention, said body may have a parallelepiped shape and said at least one pair of magnets may be hung pivotally to two opposite edges of one of its faces.

In other aspects, said body may have a polygonal or cylindrical shape.

In the electric energy generator from vibrations of the present invention, said electric coils may have a substantially planar extension.

In the electric energy generator from vibrations of the present invention, said central body (7) may be fixedly connected to a frame (2) which said permanent magnets (3, 4) pivotally hang from, said central body being connectable to said vibration source (11) at the opposite side relative to that where the magnets hang from.

The objects of the present invention are also achieved by a method for converting vibrational mechanical energy into electrical energy by:

providing a generator comprising a body (7) of non-ferromagnetic material, at least one pair of permanent magnets (3, 4) pivotally hung from said body in such a way that said body is arranged therebetween, said magnets being magnetized in such a way that a repulsive force is established tending to keep said magnets spread apart in an equilibrium position, and a plurality of electric coils (8, 9, 10) arranged on the surface of said body in such a way as to intercept the magnetic field generated by said magnets, submitting said generator to a vibrational field capable of being adapted to contrast said repulsive force to oscillate said pair of magnets about said equilibrium position thereby generating a magnetic flux variation, and obtaining electric energy as output from said electric coils.

In other aspects of the method of the present invention, said magnets of at least one pair of permanent magnets may be connected with said body about hinge axes (X, Y) parallel and coplanar and the force generated by said vibrational field is directed in a direction orthogonal to said hinge axes.

According to one aspect of the invention, the generator comprises a body made from non-ferromagnetic material and at least one pair of permanent magnets pivotally hung from said body so that said body is arranged between them, said magnets being magnetized so that a repulsive force is established therebetween tending to keep said magnets spread apart in an equilibrium position. The generator also comprises a plurality of electric coils arranged on the surface of the body so as to intercept the magnetic field generated by the magnets. The body is configured to be connectable to a vibration source which causes the magnets to oscillate around their equilibrium position, thereby generating a magnetic flux variation linked with said plurality of electric coils.

In a preferred embodiment the at least one pair of magnets have faces of equal magnetic polarity turned to each other from opposite sides of said body.

BRIEF DESCRIPTION OF THE DRAWINGS

The characteristics and the advantages of the electric energy generator from vibrations will be apparent from the following description of an embodiment thereof given as a non-limiting example with reference to the attached drawing in which.

DETAILED DESCRIPTION OF THE INVENTION

Figure 1:
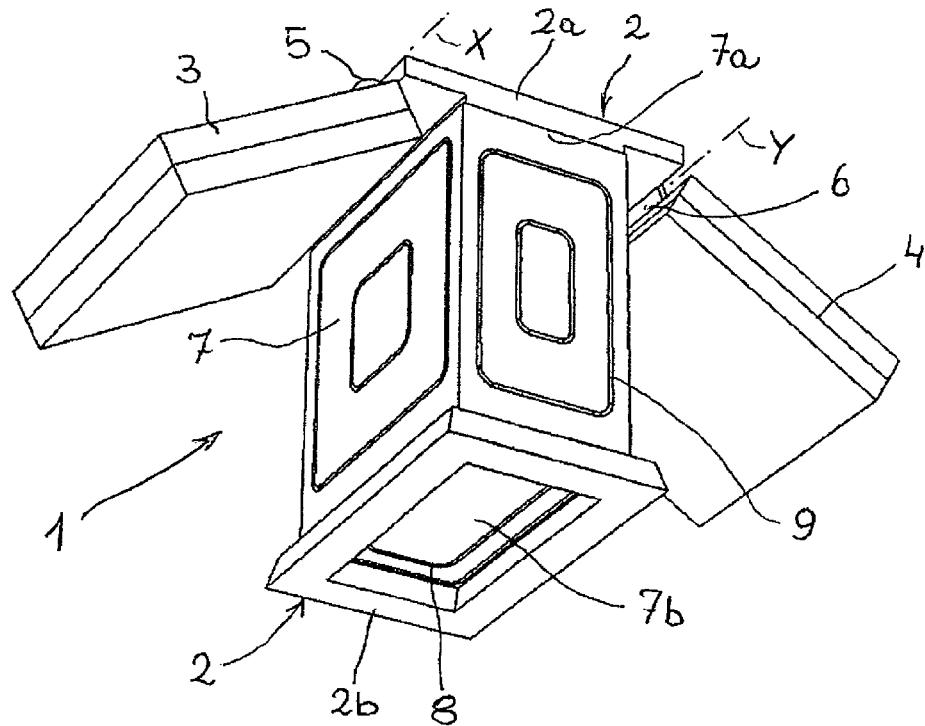
FIG. 1 is a perspective view of the generator according to the present invention.
Figure 2:
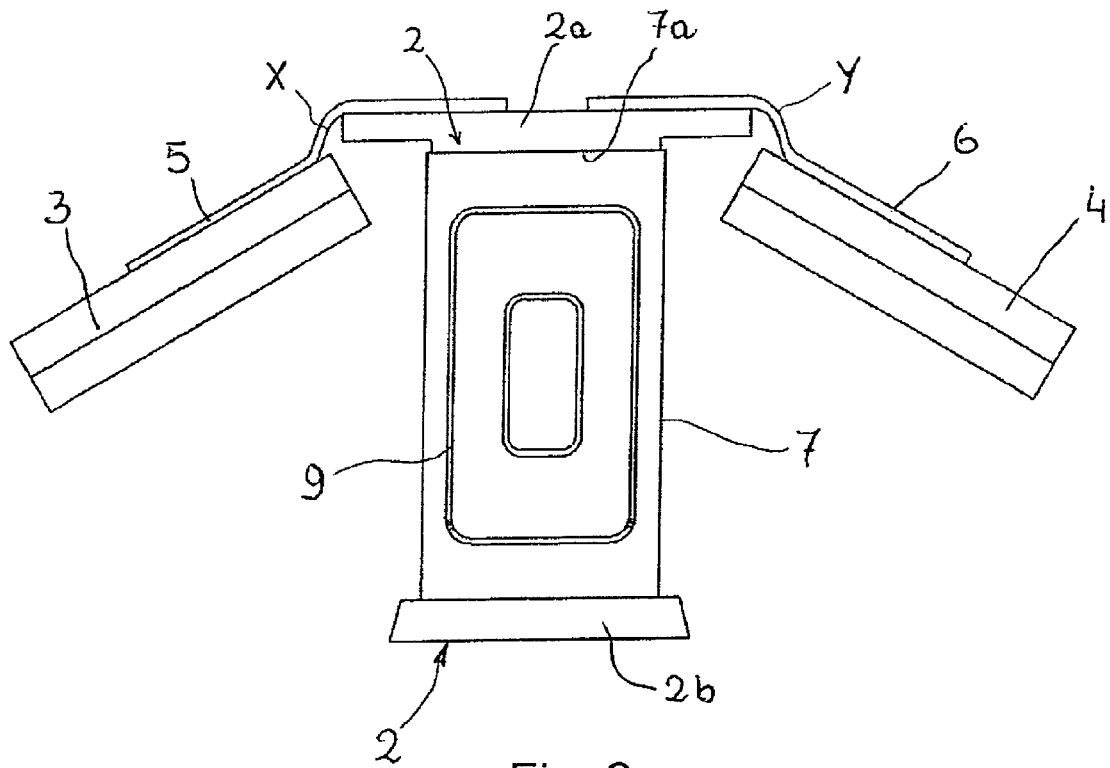
FIG. 2 is a schematic side view of the generator of FIG. 1 in its open configuration.
Figure 3:
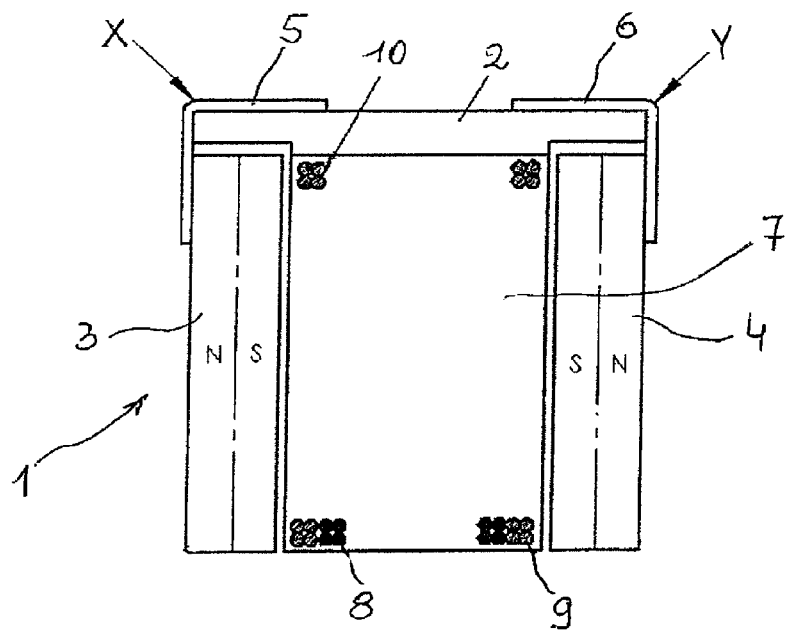
FIG. 3 is a schematic side view of the generator of FIG. 1 in its closed configuration.

With reference to FIGS. 1, 2 and 3, an electric energy generator from vibrations is illustrated generally indicated with reference numeral 1. The generator 1 comprises a frame 2 for connecting the generator to a vibrating base, not shown, a central body 7, made from non-ferromagnetic material, for example plastic, rigidly connected to the frame 2 and a pair of permanent magnets 3 and 4 connected to the frame 2 through respective rotational members 5 and 6 having a hinge function.

In the embodiment illustrated in the mentioned figures, the frame 2 is formed by two frame portions indicated by 2a and 2b connected to opposite sides of the central body 7, said frame portions being defined as upper and lower frame portions, the terms "upper" and "lower" exclusively referring to the position of the frame portions in the attached drawings. The two magnets 3 and 4 are connected to the upper frame portion 2a through the rotational members 5 and 6. The lower frame portion 2b is substantially a framework through which the central body 7 is connected to the vibrating base, not shown.

Figure 6:
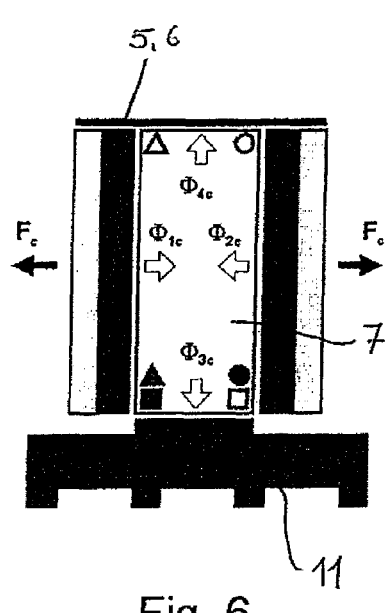
FIGS. 6 and 7 illustrate the magnetic flux variation diagram linked with the coils when passing from the closed configuration to the open configuration, respectively.
Figure 7:
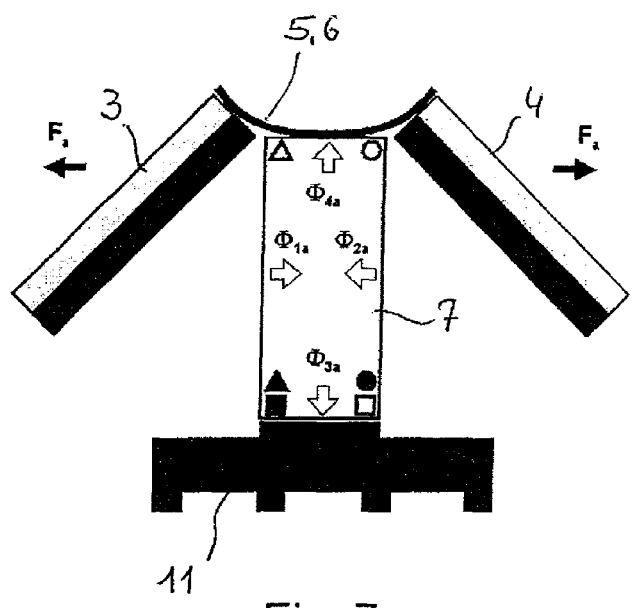

The rotational members 5 and 6 are preferably made from flexible bands, for example, made from metal, polymer or composite material, or with functionally equivalent elements, for example rotary hinges. The rotational members 5 and 6 can have constant elastic properties, including the case of zero rigidity, or elastic properties depending on the configuration taken on, like those obtained, for example, by using flexible springs with non linear elastic characteristics. Of course, even if in the embodiment of the invention, two distinct rotational members are foreseen, it should be clear that the variant of having a single rotational member like the one shown in FIGS. 6 and 7, is absolutely equivalent.

In the present embodiment of the invention, the central body 7 has, as an example, a parallelepiped shape. The two permanent magnets 3 and 4 extend from the upper frame portion 2a at the two opposite faces of the central body 7. The rotational members 5 and 6 in this case behave like flexible hinges having hinge axes X and Y parallel one another and the two magnets 3 and 4 are hung from the body 7 so that the body 7 is arranged therebetween and, in particular, faces them with two opposite faces.

The polarization of the two permanent magnets 3 and 4 is such that the magnets undergo a repulsive type magnetic force the intensity of which decreases as the distance between the magnets increases. In the present embodiment of the invention two faces of the magnets having the same polarity face towards the body 7 and therefore face each other. If there are no accelerations acting, the generator is arranged in its resting or equilibrium configuration illustrated in FIGS. 1 and 2, in which the two magnets are spread apart with respect to the body 7. The equilibrium position of the mobile magnets illustrated in these figures depends upon the force of the magnetic field, on the weight of the magnets themselves and on the possible elasticity value of the rotational members 5 and 6 for the connection to the frame 2.

In a case like that shown in FIG. 2, in which the hinge axes X and Y defined by the rotational members 5 and 6 are parallel, but do not coincide, accelerations in a direction perpendicular to the plane on which two said axes lie, force the magnets 3 and 4 to vary their distance from the central body 7. In particular, accelerations directed from the lower frame portion 2b to which the vibrating base is connected, towards the upper frame portion 2a, from which the rotational members 5 and 6 extend, cause the magnets 3 and 4 to come closer to the central body 7. The closest configuration is that illustrated in FIG. 3, in which the magnets are next to two opposite faces of the body 7, said faces being adjacent to upper body face 7a to which the upper frame portion 2a is fixed. Accelerations acting the same way, but in an opposite direction, i.e. in the direction from the upper frame portion 2a to the vibrating base, make the magnets move away from the central body 7. Accelerations acting in different directions also cause the magnets to move, even if in this case, not symmetrically.

Of course the frame 2 can also be integrated with the body 7, i.e. constituting a single piece with it.

On the side faces of the central body 7 and on the face 7b, called for the sake of simplicity lower face, opposite the upper face 7a, electric coils 8, 9 and 10, are respectively arranged, said coils having a substantially planar geometry, i.e. having a much smaller thickness with respect to the other two dimensions.

The vibration acting on the frame 2 from the vibrating base causes the permanent magnets to oscillate around the hinge axes X and Y, thus inducing an electromotive force at the ends of the coils 8, 9 and 10. The electric energy generated in this way can be transferred to an electric circuit of the known type for its conditioning and accumulation, for example, as described in WO2008/062377.

The repulsive magnetic force of the generator according to the invention keeps the magnets spread apart, if there are no external forces. If there is an inertial force directed perpendicular to the plane on which the hinge axes lie, the two magnets close onto the respective faces of the body 7 and there is a flux variation. When the external action stops, the magnets return into a spread out position and due to this return movement energy is generated again.

Figure 4:
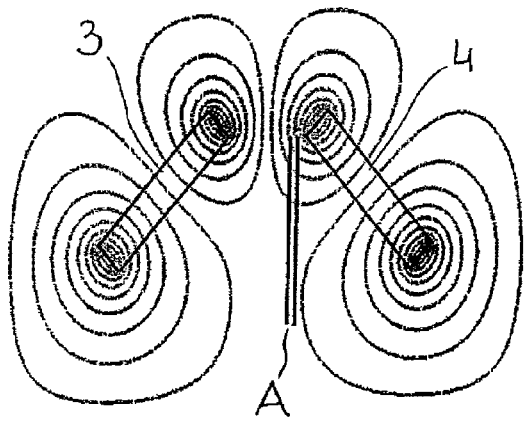
FIGS. 4 and 5 illustrate the magnetic field lines of the generator of FIG. 1 in its open and closed configuration, respectively.
Figure 5:
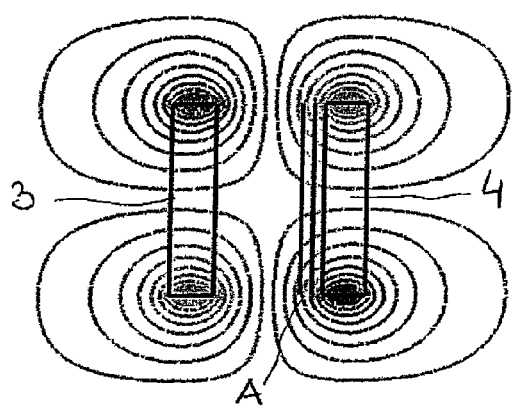

FIGS. 4 and 5 illustrate how the field lines of the magnetic induction vector change due to the movement of the magnets caused from vibrations acting in a direction perpendicular to the plane of the hinge axes X and Y, causing the magnetic flux to vary through the windings of the coil 8 arranged on the lower face 7b and of the coils 9 and 10 arranged on the side faces. Differently from many analogous known devices, in the generator according to the invention the magnetic field closes in air and is intercepted by the coils 8, 9 and 10 arranged on the non ferro-magnetic central body 7. The parallel lines indicated with A in FIGS. 4 and 5 are examples of areas in which it is possible to locate the electric coils to exploit the field variation linked to them with the movements of the permanent magnets.

As an example, FIGS. 6 and 7 schematically show the variation of the magnetic fluxes linked to the coils. In these figures the generator according to the invention is connected to a vibrating base schematically shown and generally indicated at 11, whereas the frame 2 is to be considered integral with the body 7. The geometrical figures (squares, triangles and circles), represent the various coils, each indicated with a different figure. The white geometrical figures are sections of coil windings the direction of which goes out of the sheet, whereas the black ones are sections of coil windings the direction of which enters the sheet. The white arrows indicate the fluxes (subscript "a" for the open configuration, subscript "c" for the closed configuration); flux 1 crosses the triangle-coil, flux 2 crosses the circle-coil, flux 3 crosses the square-coil. In the proposed diagram given as an example and not for limiting purposes, no coil is foreseen on the upper face, because the flux variation is negligible there; the black arrows represent repulsive magnetic forces, equal and opposite, acting on the two magnets.

The configuration of the coils is such as to allow there to be wide surfaces tending to maximize the linked flux value, without needing to rely on circuits made from ferro-magnetic material. Possible ferro-magnetic elements, not shown, having the function of magnetic deflectors, for example tabs or small appendages, can be applied to the central body 7 of non-ferromagnetic material having the sole purpose of locally distorting the magnetic field at one or more coils in order to better direct it towards the coils themselves. This configuration of the coils ensures simplicity in positioning other components which are not part of the generator, since the inner volume of the central body 7 is hollow.

On the faces of the magnets 3 and 4 facing towards the central body 7, or rather on the faces of the central body 7 facing towards the magnets 3 and 4, or also on both pairs of faces, elastic elements (not shown) can be mounted with the function of attenuating the impacts of contact between mobile and fixed parts, so as to conserve the structural integrity of the generator after repeated impacts, and to reduce the kinetic energy dissipated in the impacts.

The rotational members 5 and 6 which connect the oscillating magnets 3 and 4 to the central body 7 have the function of defining the two rotation axes X an Y around which the two magnets are able to move. Since one of the purposes of the present invention is to reduce energy dissipation and surface damaging connected to the mutual sliding of the mobile parts, the preferred implementation for such rotational members 5 and 6 foresees the use of flexible members. Such flexible members can be made from woven or unwoven polymeric material (e.g. Kevlar or nylon), possibly impregnated with resins (e.g. polyurethane), monolayer metal material (e.g. silicon steel or super-elastic Ni—Ti alloys) or in the form of multi-layer packs. The rotational members 5 and 6 can also be made in other shapes, for example by using pins pivoting in suitable seat or conventional rotary hinges.

Even though in the present description reference is made to a single pair of magnets, a possible variation of the invention can be foreseen in which two pairs of magnets are arranged around the central body 7. In particular, two pairs of magnets can be foreseen at two opposite faces of the body 7: in such a case the two pairs of magnets shall oscillate, in presence of external inertial forces, around two directions which are perpendicular to each other. In a further embodiment, a greater number of pairs of magnets can be foreseen around the central body 7, which in that case can take on a polygonal shape corresponding to the number of pairs of magnets, making a more complex geometrical configuration, but preferred from an energetic point of view. In an extreme configuration, the central body 7 can take on a cylindrical shape and the magnets of each pair can take on the shape of rods extending along said cylindrical body.

Compared to known prior art devices for converting vibrational energy into electric energy, the generator of the present invention offers some important advantages relative to the dynamic performances which can be obtained and to the technological aspects.

In particular, with respect to known solutions having an equal volume in the closed configuration, the constructive solution according to the invention allows there to be:

a—A longer stroke of the magnets and higher inertial masses, which corresponds to an increase of the maximum energy which can be extracted from a support undergoing vibration movement;

b—Reduced or zero loss due to sliding or rolling friction;

c—Zero or reduced adhesive, erosive, fatigue or Hertzian wearing due to sliding or fretting;

d—Absence of the possibility of seizing;

e—Small dimensions in applications requiring the miniaturization of the system which the generator is part of; this thanks to the possibility of inserting devices (e.g. electric and electronic components such as sensors and circuitry) inside the hollow central body;

f—Good tolerance to the possible presence of particulate matter;

g—Simple construction thanks to the absence of ferromagnetic cores;

h—High efficiency thanks to the low friction losses and the increase of time variations of the linked fluxes and to the reduced losses due to parasitic currents and to magnetic hysteresis;

i—The use of elastic members having a suitable, not necessarily constant, rigidity, such as members connecting the magnets to the central body, together with a proper magnetic and mechanical sizing of the magnets, allows the progression of the mutual repulsive force of the mobile members to be adjusted as a function of the reciprocal position in a way which best allows the energy associated with the support vibrations to be absorbed.

In brief, the electric energy generator from vibrations according to the present invention offers the following advantages with respect to analogous known devices: high efficiency, possibility of being miniaturized, simple to construct, low manufacturing costs and mechanically robust.

Thanks to the reduced size, the system can be used on board of portable devices and, in general, can be mounted in all those systems which cannot be modified in an invasive manner.

Variations and/or modifications can be made to the electric energy generator from vibrations according to the present invention without departing from the scope of protection of the invention as defined in the following claims.

The invention claimed is:

1. An electric energy generator from vibrations comprising a body of non-ferromagnetic material; at least one pair of permanent magnets pivotally hung from said body in such a way said body is arranged therebetween, said magnets being magnetized in such a way that a repulsive force is established tending to keep said magnets spread apart in an equilibrium position; and a plurality of electric coils arranged on the surface of said body in such a way as to intercept the magnetic field generated by said magnets, wherein said body is capable of being configured to be connected to a vibration source, said vibrations causing an oscillation of said magnets about said equilibrium position which generates a corresponding variation of magnetic flux linked to said plurality of electric coils.

2. The electric energy generator from vibrations according to claim 1, wherein said at least one pair of magnets has faces of equal magnetic polarity turned to each other from opposite sides of said body.

3. The electric energy generator from vibrations according to claim 1, wherein said at least one pair of magnets is connected with said body through at least one rotational member defining two parallel hinge axes.

4. The electric energy generator from vibrations according to claim 3, wherein each magnet of said at least one pair of permanent magnets is pivotally connected with said body through a respective rotational element, said hinge axes being at parallel, opposed edges of said body.

5. The electric energy generator from vibrations according to claim 1, wherein said body has a parallelepiped shape and said at least one pair of magnets is hung pivotally to two opposite edges of one of its faces.

6. The electric energy generator from vibrations according to claim 1, wherein said body has a polygonal or cylindrical shape.

7. The electric energy generator from vibrations according to claim 1, wherein said electric coils have a substantially planar extension.

8. The electric energy generator from vibrations according to claim 1, wherein said central body is fixedly connected to a frame from which said permanent magnets pivotally hang, said central body being connectable to said vibration source at an opposite side relative to the side from which the magnets hang.

9. A method for converting vibrational mechanical energy into electrical energy comprising:

providing a generator comprising a body of non-ferromagnetic material, at least one pair of permanent magnets pivotally hung from said body in such a way that said body is arranged therebetween, said magnets being magnetized in such a way that a repulsive force is established tending to keep said magnets spread apart in an equilibrium position, and a plurality of electric coils arranged on the surface of said body in such a way to intercept the magnetic field generated by said magnets;

submitting said generator to a vibrational field capable of being adapted to contrast said repulsive force to oscillate said pair of magnets about said equilibrium position, thereby generating a magnetic flux variation; and obtaining electric energy as output from said electric coils.

10. The method according to claim 9, wherein said magnets of at least one pair of permanent magnets are connected with said body about hinge axes parallel and coplanar, and the force generated by said vibrational field is directed in a direction orthogonal to said hinge axes.

* * * * *